(12) United States Patent
Hasegawa

(10) Patent No.: US 8,046,866 B2
(45) Date of Patent: Nov. 1, 2011

(54) WIPER SYSTEM

(75) Inventor: Takashi Hasegawa, Kosai (JP)

(73) Assignee: Asmo Co., Ltd., Shizuoka-pref. (JP)

( * ) Notice: Subject to any disclaimer, the term of this patent is extended or adjusted under 35 U.S.C. 154(b) by 631 days.

(21) Appl. No.: 12/232,333

(22) Filed: Sep. 16, 2008

(65) Prior Publication Data

US 2009/0094773 A1   Apr. 16, 2009

(30) Foreign Application Priority Data

Oct. 15, 2007   (JP) .................. 2007-267444

(51) Int. Cl.
   *B60S 1/06*   (2006.01)
   *B60S 1/16*   (2006.01)

(52) U.S. Cl. .............. 15/250.21; 15/250.3; 15/250.31; 296/96.15

(58) Field of Classification Search ............. 15/250.3, 15/250.31, 250.21, 250.23, 250.001; 296/96.15, 296/96.17, 192

See application file for complete search history.

(56) References Cited

U.S. PATENT DOCUMENTS

| 2,624,904 | A  | * | 1/1953 | Wianco ............ 15/250.23 |
| 6,557,205 | B2 | * | 5/2003 | Ishikawa .......... 15/250.21 |
| 2002/0100137 | A1 | | 8/2002 | Matsumoto et al. |
| 2004/0093680 | A1 | | 5/2004 | Kagawa |
| 2005/0217056 | A1 | | 10/2005 | Kagawa et al. |

FOREIGN PATENT DOCUMENTS

| JP | A-2005-014645 | 1/2005 |
| JP | A-2005-199843 | 7/2005 |
| JP | A-2008-013067 | 1/2008 |

OTHER PUBLICATIONS

U.S. Appl. No. 12/213,896, filed Jun. 26, 2008, Hasegawa.

* cited by examiner

*Primary Examiner* — Gary Graham
(74) *Attorney, Agent, or Firm* — Posz Law Group, PLC

(57) ABSTRACT

A wiper support shaft supports a wiper, which wipes a windshield glass. The wiper support shaft projects outward through an opening of a cowl louver that is placed on a vehicle front side of the windshield glass. A four-bar linkage drives the wiper support shaft to move the wiper support shaft in the opening of the cowl louver in such a manner that a wiping range of the wiper, which is installed to the wiper support shaft, changes on the windshield glass. A covering member is supported by the wiper support shaft at a location inside the cowl louver to limit direct viewing of the four-bar linkage through the opening of the cowl louver.

20 Claims, 9 Drawing Sheets

US 8,046,866 B2

WIPER SYSTEM

CROSS REFERENCE TO RELATED APPLICATION

This application is based on and incorporates herein by reference Japanese Patent Application No. 2007-267444 filed on Oct. 15, 2007.

BACKGROUND OF THE INVENTION

1. Field of the Invention

The present invention relates to a wiper system for a vehicle.

2. Description of Related Art

In a case of a wiper system disclosed in Japanese Unexamined Patent Publication No. 2002-225679 (corresponding to US2002/0100137A1), a wiper support shaft supports a wiper and is movable in a width direction of a vehicle through use of a four-bar linkage.

Specifically, the wiper support shaft, which projects outward through an elongated hole of a cowl louver located on a vehicle front side of a windshield glass, is driven to move along the elongated hole of the cowl louver. With this structure, even in a case where a length of a wiper blade of the wiper is increased to increase a wiping area on the windshield glass, interference of a distal end portion of the wiper blade with an A-pillar of the vehicle can be limited by moving the wiper support shaft at a lower return position of the wiper.

However, it is required to increase an open area of the elongated hole to enable the movement of the wiper support shaft in the width direction of the vehicle. Therefore, a drive mechanism or the like of a main body of the wiper system can be directly viewed through the elongated hole (opening), and thereby the outer appearance of the entire system may possibly be deteriorated.

SUMMARY OF THE INVENTION

The present invention addresses the above disadvantage. Thus, it is an objective of the present invention to limit direct viewing of a portion of a wiper system through an opening provided in a cowl louver of a vehicle. To achieve the objective of the present invention, there is provided a wiper system for a vehicle. The wiper system includes a wiper support shaft, a drive mechanism and a covering member. The wiper support shaft supports a wiper, which is adapted to wipe a windshield glass of the vehicle. The wiper support shaft projects outward through an opening of a cowl louver that is placed on a vehicle front side of the windshield glass. The drive mechanism drives the wiper support shaft to move the wiper support shaft in the opening of the cowl louver in such a manner that a wiping range of the wiper, which is installed to the wiper support shaft, changes on the windshield glass. The covering member is placed inside the cowl louver and is supported by the wiper support shaft. The covering member is moved in response to movement of the wiper support shaft and covers the opening of the cowl louver to limit direct viewing of the drive mechanism through the opening of the cowl louver.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

A wiper system 10 according to an embodiment of the present invention will be described with reference to FIGS. 1 to 9.

Figure 9:
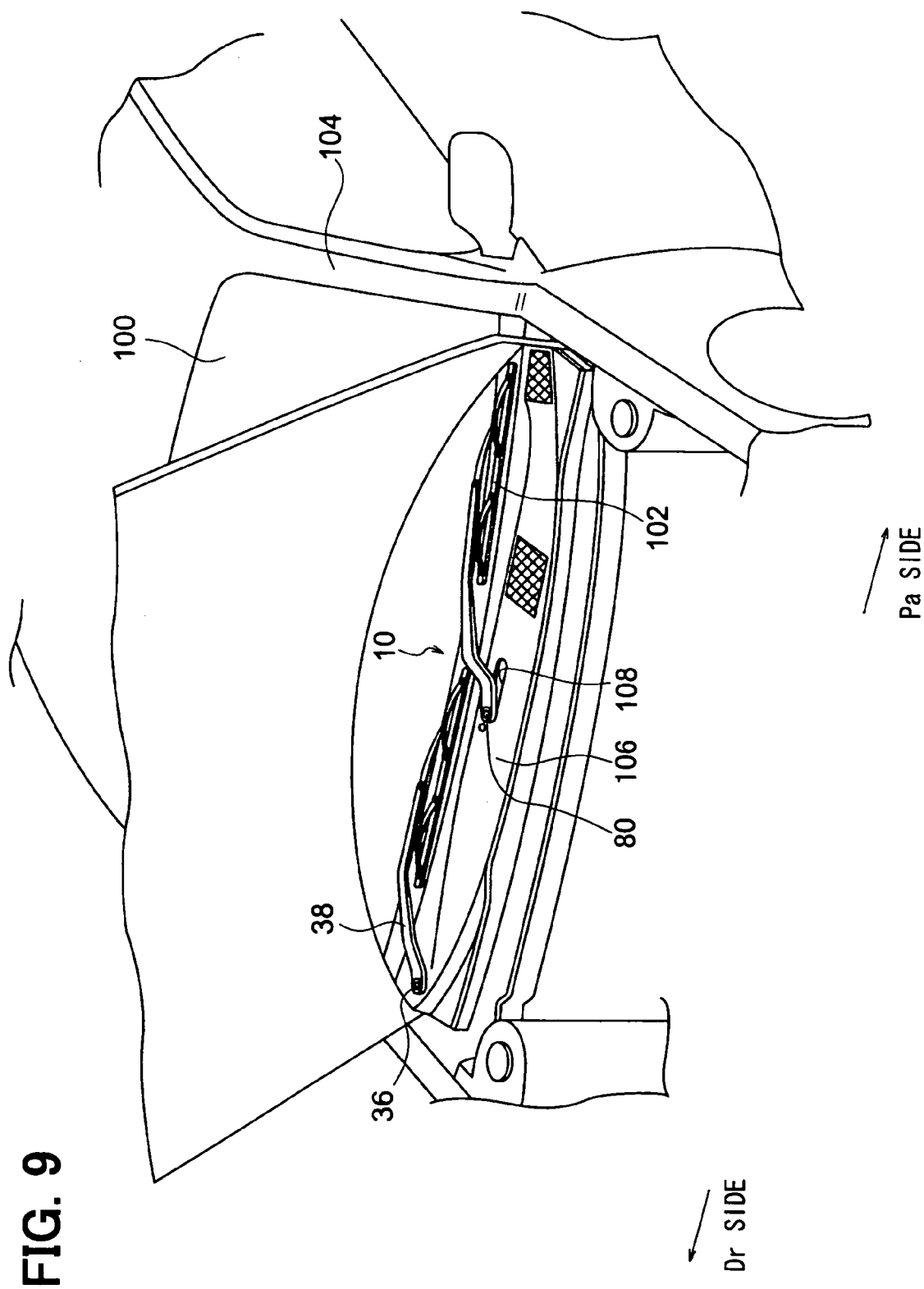
FIG. 9 is a perspective view showing a vehicle, to which the wiper system of the embodiment is installed.

As shown in FIG. 9, the wiper system 10 is installed along a lower edge of a windshield glass 100 at a location below a cowl louver 106, which is an exterior component that extends in a width direction of a vehicle, i.e., a left-right direction of the vehicle. In other words, the wiper system 10 is installed on a lower side of the cowl louver 106 in FIG. 9, i.e., a side where a rear side surface of the cowl louver 106 is located.

Figure 5:
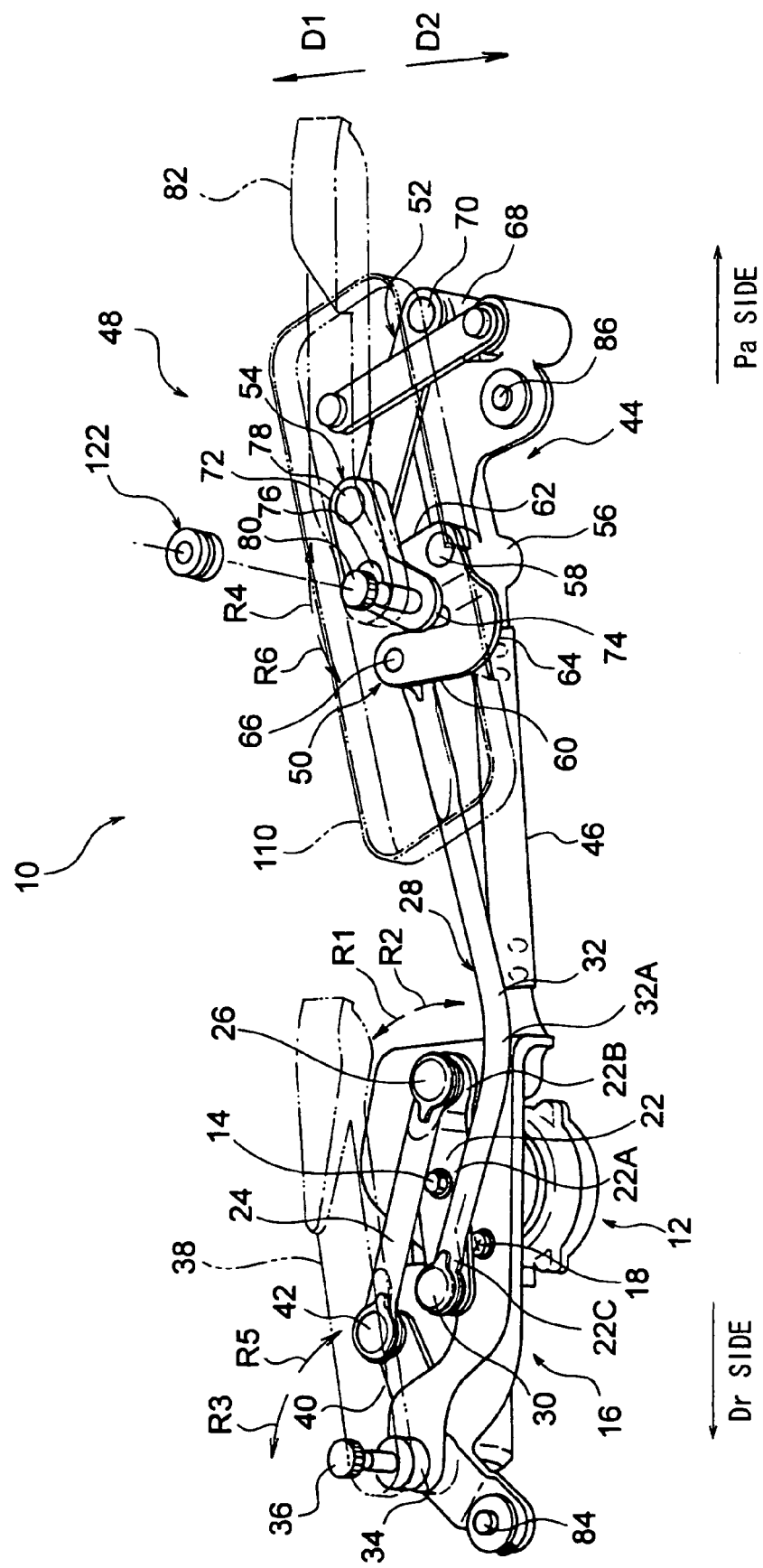
FIG. 5 is a partial perspective view of the wiper system of the embodiment in one operational state seen from a front upper side of the vehicle upon installation to the vehicle.
Figure 6:
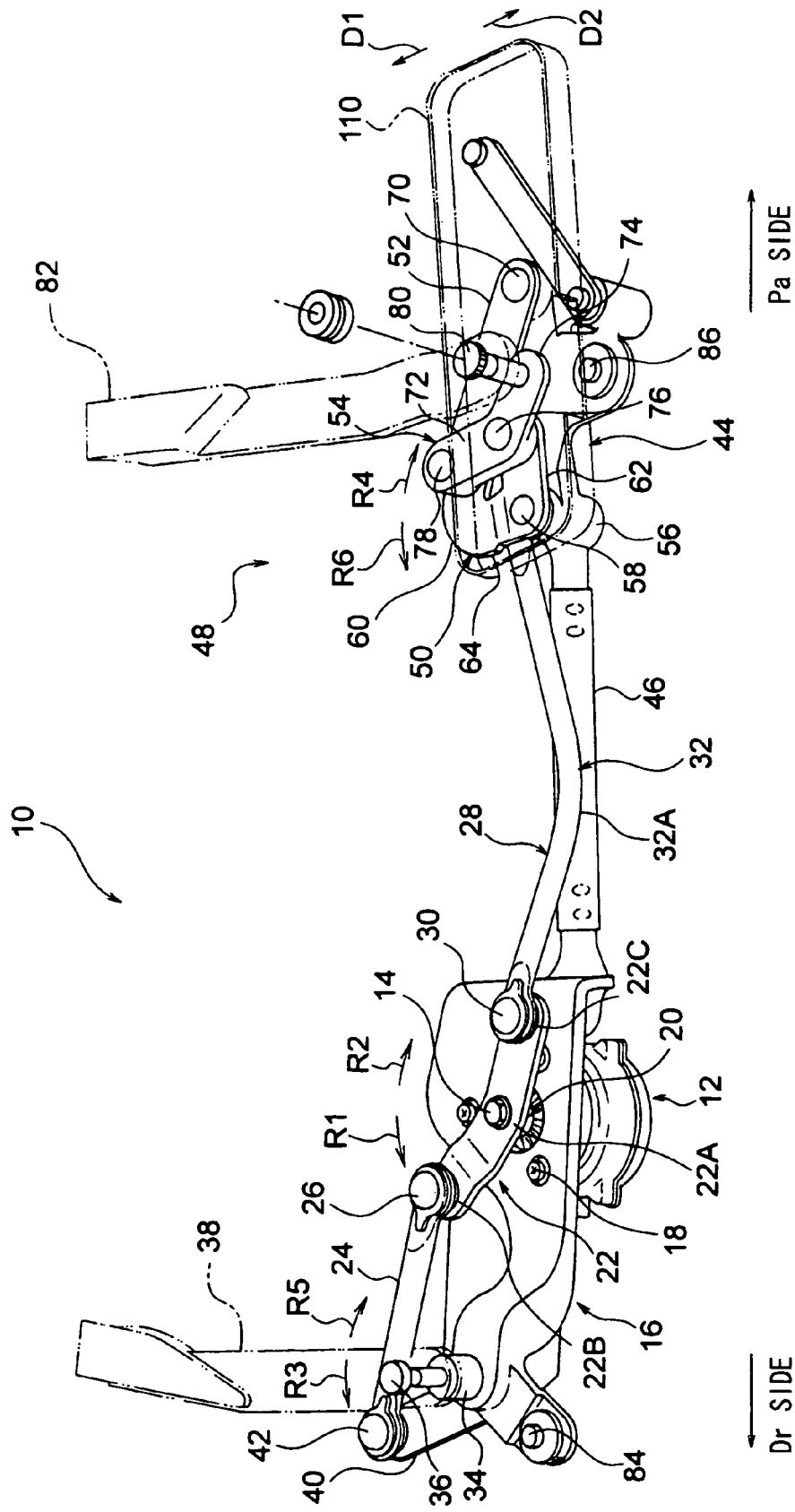
FIG. 6 is a partial perspective view of the wiper system of the embodiment in another operational state seen from the front upper side of the vehicle upon installation to the vehicle.
Figure 7:
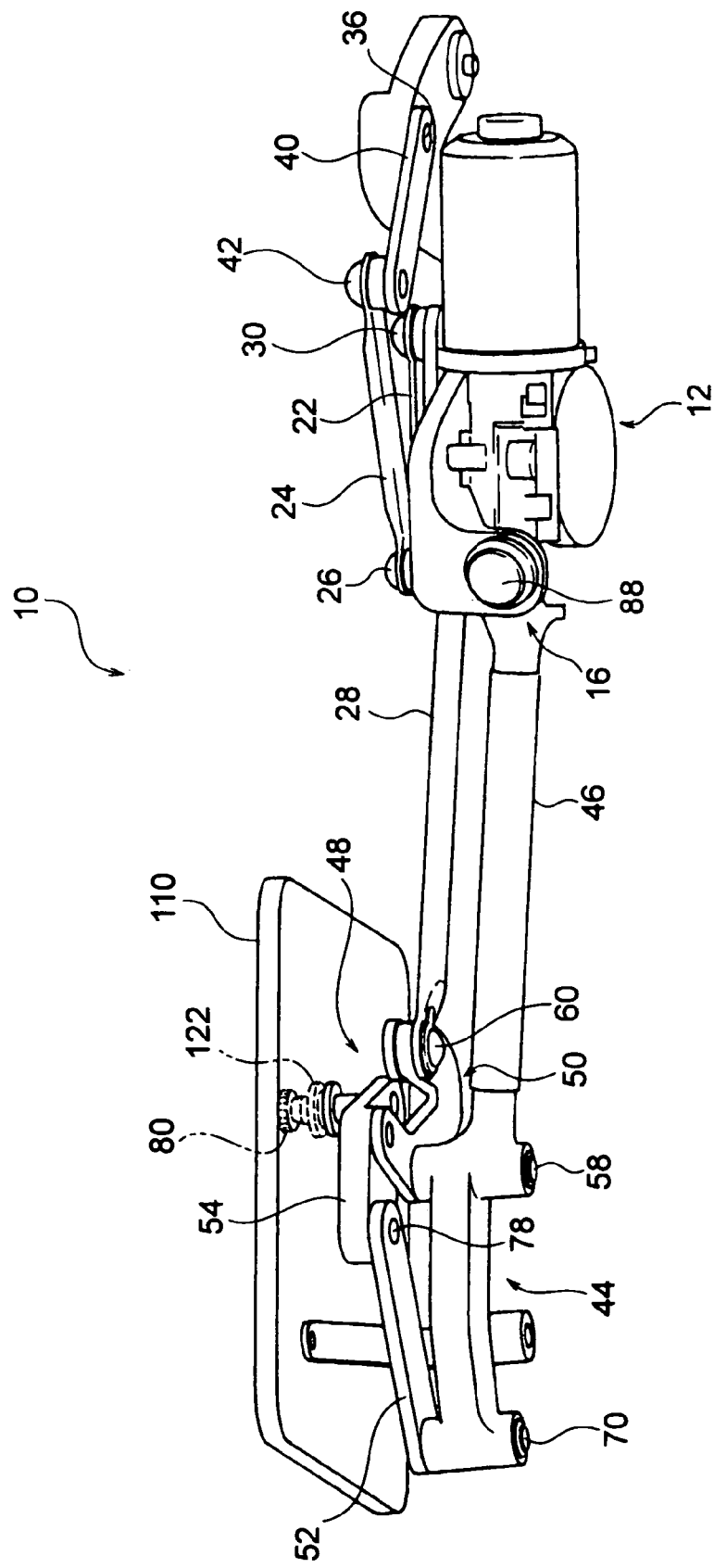
FIG. 7 is a partial perspective view of the wiper system of the embodiment seen from a rear lower side of the vehicle upon installation to the vehicle.

With reference to FIGS. 5 to 7, the wiper system 10 includes a wiper motor 12, which may be, for example, an electric motor that has a speed reducing mechanism for reducing a rotational speed of the motor. The wiper motor 12 includes an output shaft 14, which is rotatable in both directions (a forward direction and a backward direction). The wiper motor 12 is placed below a first frame member 16, which is located on a driver side (a Dr side in the drawing) of the wiper system 10, and the wiper motor 12 is fixed integrally to the first frame member 16 by fixing elements 18.

The output shaft 14 is received in a through hole 20, which extends through the first frame member 16 in the vertical direction, from a lower side of the first frame member 16 and projects on an upper side of the first frame member 16. A center portion 22A of an elongated crank arm 22 is integrally rotatably fixed to a distal end portion of the output shaft 14.

One end portion 22B of the crank arm 22 is displaced from the center portion 22A on one side (an upper side) of the center portion 22A in an axial direction of the output shaft 14. One end portion of a first connecting rod 24 is pivotably connected to the one end portion 22B of the crank arm 22 through a connecting shaft 26. One end portion of a second connecting rod 28 is pivotably connected to the other end portion 22C of the crank arm 22 through a connecting shaft 30.

The first connecting rod 24 and the second connecting rod 28 are connected to the crank arm 22 on one side of the crank arm 22 in the axial direction of the output shaft 14 (the vertical direction of the vehicle). The second connecting rod 28 includes a bent portion 32 at a longitudinal intermediate part of the second connecting rod 28. The bent portion 32 limits interference between the second connecting rod 28 and the first connecting rod 24 upon the rotation of the crank arm 22 in the forward and backward directions.

The bent portion 32 is bent in a direction that is perpendicular to the axial direction of the output shaft 14 (specifically, toward a side in the depth direction of the system, i.e., toward a front side in the front-to-rear direction of the vehicle, as indicated by an arrow D2 in the drawing). That is, the bent portion 32 is bent such that an apex 32A of the bent portion 32 is placed on the side of the connecting shafts 30, 66 (located at the end portions, respectively, of the second connecting rod 28) in the direction perpendicular to the axial direction of the output shaft 14.

Figure 8:
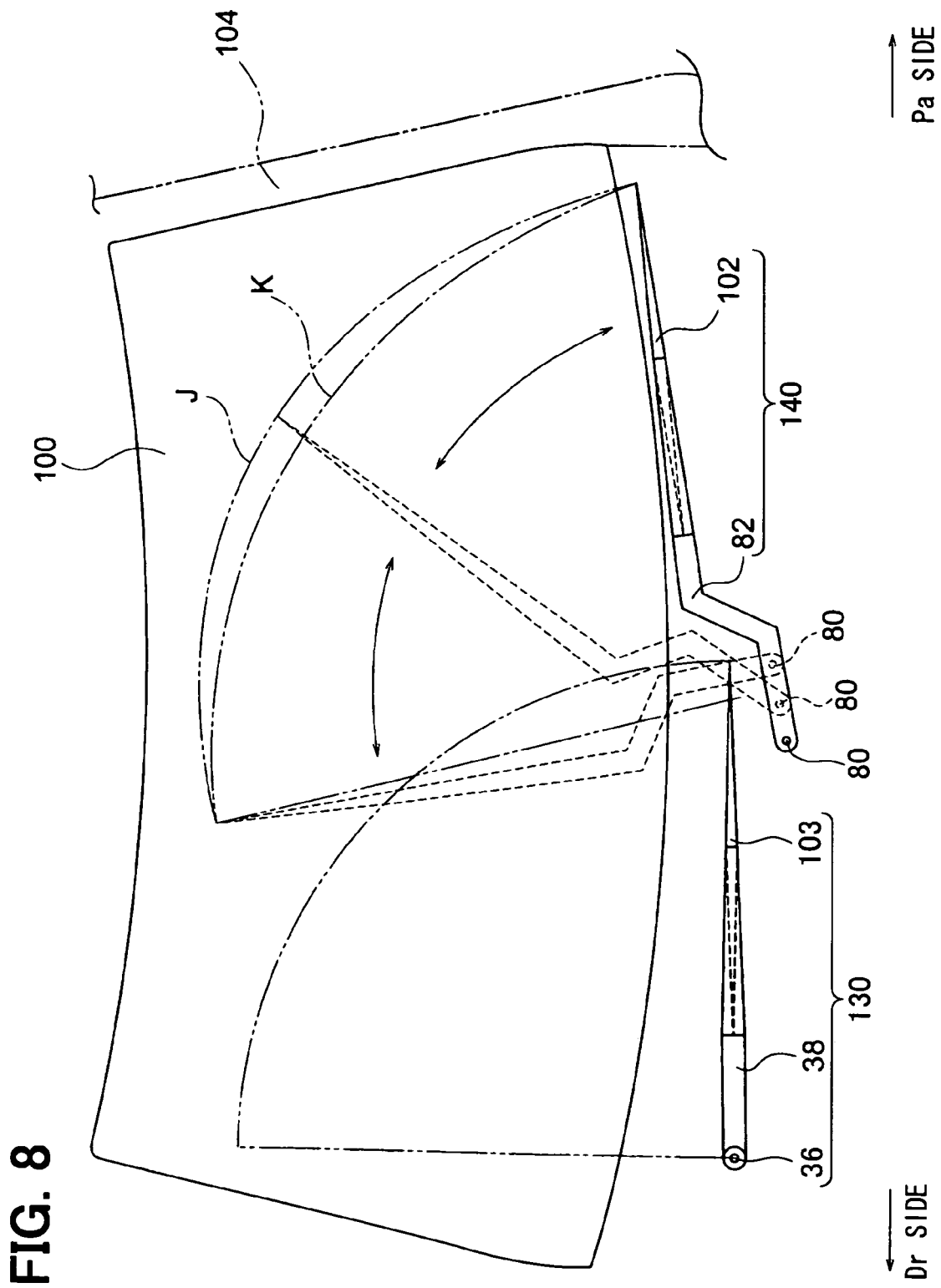
FIG. 8 is a plan view showing wipers of the wiper system of the embodiment and a windshield glass.

A first pivot holder 34 is formed integrally in the first frame member 16 to pivotably support the first pivot shaft 36. With reference to FIG. 8, a base end portion of a wiper arm 38 of a driver side wiper 130 (the DR side) is integrally pivotably fixed to the first pivot shaft 36 to wipe the windshield glass 100 with a wiper blade 103 of the driver side wiper 130 upon rotation of the wiper motor 12.

Referring back to FIGS. 5 to 7, a base end portion of a pivot lever 40, which is placed on one side of the first pivot shaft 36 in the depth direction of the system (a rear side of the first pivot shaft 36 in the front-to-rear direction of the vehicle, as indicated by an arrow D1 in the drawing), is integrally pivotably fixed to the first pivot shaft 36. The other end portion of the first connecting rod 24 is pivotably connected to a swing end portion of the pivot lever 40 through a connecting shaft 42.

A second frame member 44 is placed at a front passenger seat side (a Pa side in the drawing) of the wiper system 10. The second frame member 44 and the first frame member 16 are integrally installed through a connecting frame 46.

The second frame member 44 is provided integrally with a main lever 50, a sub-lever 52 and a connecting lever 54, which form a four-bar linkage (drive mechanism) 48. Furthermore, a second pivot holder (serving as a first support member) 56 is formed integrally at the center of the second frame member 44 (the center in the longitudinal direction of the system, i.e., in the width direction of the vehicle). A second pivot shaft 58 is pivotably supported by the second pivot holder 56.

The main lever 50 is placed on the one side of the second pivot shaft 58 in the depth direction of the system (the rear side of the second pivot shaft 58, as indicated by the arrow D1 in the drawing). The main lever 50 is configured into a generally U-shape in its plan view and includes a first lever portion 60, a second lever portion 62 and a connecting lever portion 64. The first lever portion 60 and the second lever portion 62 are generally parallel to each other. The connecting lever portion 64 connects between the first lever portion 60 and the second lever portion 62.

The other end portion of the second connecting rod 28 is pivotably connected to a swing end portion of the first lever portion 60 through the connecting shaft 66. A base end portion of the second lever portion 62 is integrally pivotably fixed to the second pivot shaft 58. The second lever portion 62 is displaced from the first lever portion 60 on the one side of the first lever portion 60 in the axial direction of the second pivot shaft 58 (on the upper side of the first lever portion 60 in the vertical direction of the vehicle).

A follower shaft holder (serving as a second support member) 68 is formed integrally with the second frame member 44 on the outer side in the longitudinal direction of the system (i.e., the outer side on the front passenger seat side of the vehicle). A follower shaft 70 is pivotably supported by the follower shaft holder 68. The sub-lever 52 is placed on the one side of the follower shaft 70 in the depth direction of the system (i.e., the rear side of the follower shaft 70 in the front-to-rear direction of the vehicle indicated by the arrow D1 in the drawing). A base end portion of the sub-lever 52 is integrally pivotably fixed to the follower shaft 70.

The connecting lever 54 includes an elongated lever main body portion 72 and an extended portion 74. The extended portion 74 extends from one end of the lever main body portion 72. The ends of the lever main body portion 72 are pivotably connected to the swing end portion of the second lever portion 62 and the swing end portion of the sub-lever 52, respectively, through the connecting shafts (serving as first and second connecting members) 76, 78. A wiper arm 82 of a passenger side wiper 140 (located on the Pa side in the drawing) is integrally fixed to an extended end portion of the extended portion 74 through a wiper support shaft 80.

A covering member 110, which limits direct viewing of the interior (e.g., the drive mechanism) through an elongated opening 108 (see FIG. 9) of the cowl louver 106, is supported by the wiper support shaft 80.

The structure of the covering member 110 will be described later.

The wiper system 10 is installed to the vehicle body through fixing portions 84, 86, 88, which are provided to the first frame member 16 and the second frame member 44.

Next, the operation of the wiper system 10 will be described.

In the wiper system 10 of the present embodiment, the output shaft 14 of the wiper motor 12 is rotated in both directions (the direction of the arrow R1 and the direction of the arrow R2). Thereby, the crank arm 22 is pivoted in both directions, so that the first connecting rod 24 and the second connecting rod 28 are reciprocated in opposite directions, respectively, in the longitudinal direction of the system.

Furthermore, when the first connecting rod 24 and the second connecting rod 28 are reciprocated in the opposite directions, respectively, the pivot lever 40 and the main lever 50 are reciprocally pivoted in opposite directions, respectively.

That is, the first connecting rod 24 and the second connecting rod 28, which are pivotably connected to the ends, respectively, of the crank arm 22, are reciprocated in the opposite directions, respectively, upon the reciprocal movement of the crank arm 22. Thus, the pivot lever 40 and the main lever 50, which are respectively connected to the first connecting rod 24 and the second connecting rod 28 and are provided on the one side in the depth direction of the system (i.e., the rear side in the front-to-rear direction of the vehicle indicated by the arrow D1 in the drawing), are also reciprocally pivoted in the opposite directions, respectively.

Specifically, for example, as shown in FIGS. 5 and 6, when the pivot lever 40 is pivoted toward the one side (the direction of the arrow R3 in the drawing), the main lever 50 is pivoted toward the other side (the direction of the arrow R4 in the drawing). Also, when the pivot lever 40 is pivoted toward the other side (the direction of the arrow R5 in the drawing), the main lever 50 is pivoted toward the one side (the direction of the arrow R6 in the drawing).

Here, the main lever 50, the sub-lever 52 and the connecting lever 54, which reciprocally pivot the other wiper arm 82, form the four-bar linkage 48. Therefore, as discussed above, when the main lever 50 and the pivot lever 40 (the pivot lever 40 being used to reciprocally pivot the wiper arm 38) are reciprocally pivoted in the opposite directions, respectively, the wiper arms 38, 82 are reciprocally pivoted in the same wiping direction. Thereby, the windshield glass 100 (see FIG.

8) of the vehicle is wiped through the reciprocal pivot movement of the wiper arms 38, 82.

Furthermore, the wiper support shaft 80, to which the passenger seat side (Pa side) wiper arm 82 is fixed, is reciprocated in the longitudinal direction of the system upon the wiping movement through the action of the four-bar linkage 48.

Specifically, as shown in FIGS. 5 and 8, in a stop position (lower end position) of the wiper arm 82, the wiper support shaft 80 is placed at a driver side location that is close to the driver side (Dr side). Furthermore, as shown in FIGS. 6 and 8, in an upper return position (upper end position) of the wiper arm 82, the wiper support shaft 80 is moved to a passenger seat side location that is close to the passenger seat side (Pa side). In this way, it is possible to limit interference of a distal end of a wiper blade 102 of the wiper 140, which is connected to the wiper arm 82, with an A-pillar 104, which is a frame of the windshield glass 100, and it is also possible to increase a wiping range (wiping area) of the wiper arm 82 on the windshield glass 100.

As shown in FIG. 8, the wiping range of the wiper blade 102, which is supported by the movable wiper support shaft 80, becomes a range J. Furthermore, in the case where the wiper support shaft is not movable, the wiping range of the wiper blade 102 becomes a range K. Thereby, the wiping range can be increased according to the embodiment.

Next, the covering member 110, which is supported by the wiper support shaft 80, will be described in detail.

As shown in FIG. 9, the wiper support shaft 80 is placed to protrude outward through the opening 108 of the cowl louver 106.

Here, as discussed above, the wiper support shaft 80 is moved in the width direction of the vehicle (the left-right direction in FIG. 9) through the action of the four-bar linkage 48 (see FIG. 5). Therefore, a shape of the opening 108 of the cowl louver 106 is elongated in the width direction of the vehicle to guide the wiper support shaft 80.

Figure 1:
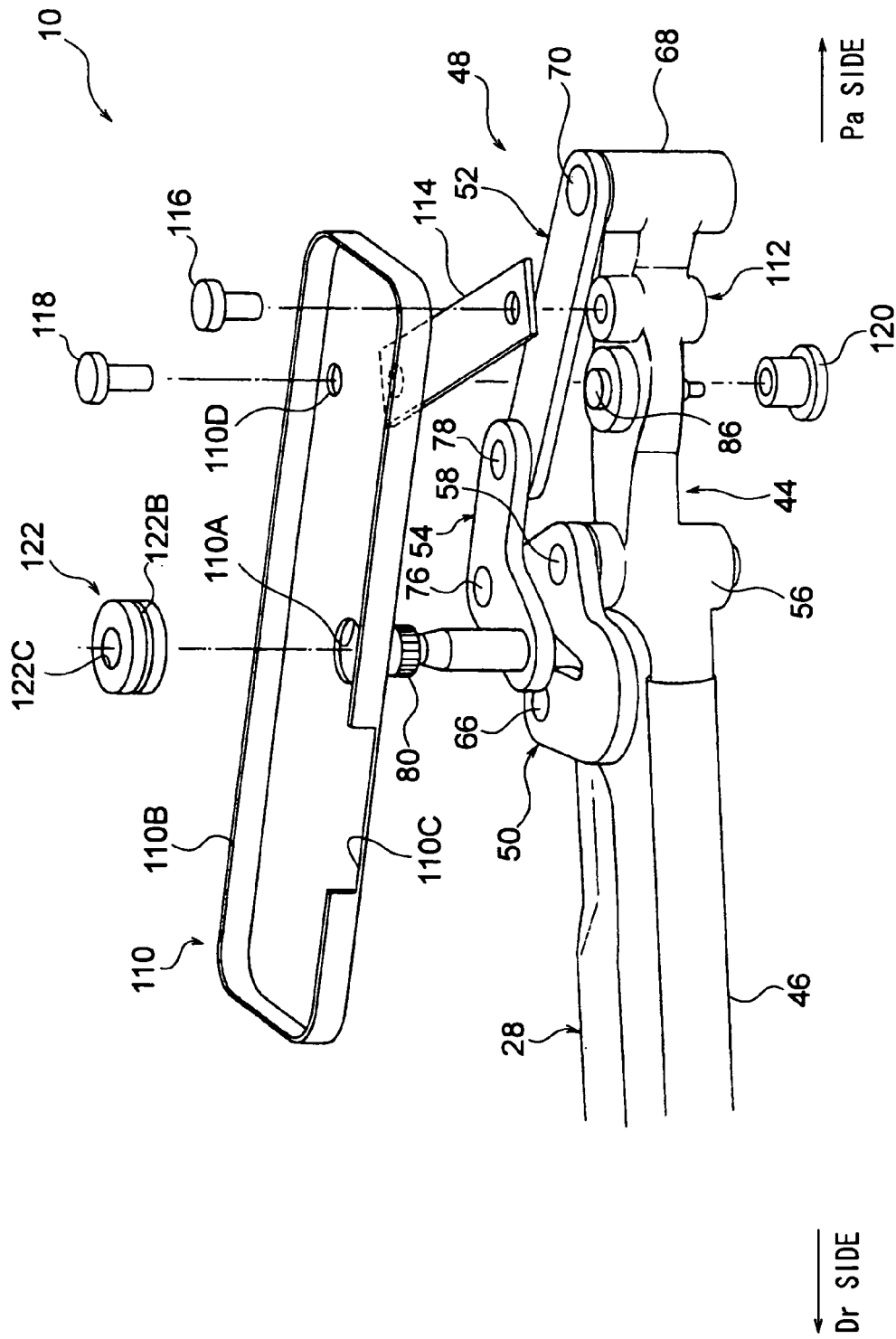
FIG. 1 is a partial exploded perspective view of a wiper system according to an embodiment of the present invention, showing a four-bar linkage and a covering member.

As shown in FIG. 1, the covering member 110, which is configured into a plate form and is moved upon movement of the wiper support shaft 80, is supported by the wiper support shaft 80 at the inner side (vehicle lower side) of the cowl louver 106 (see FIG. 9).

Figure 2:
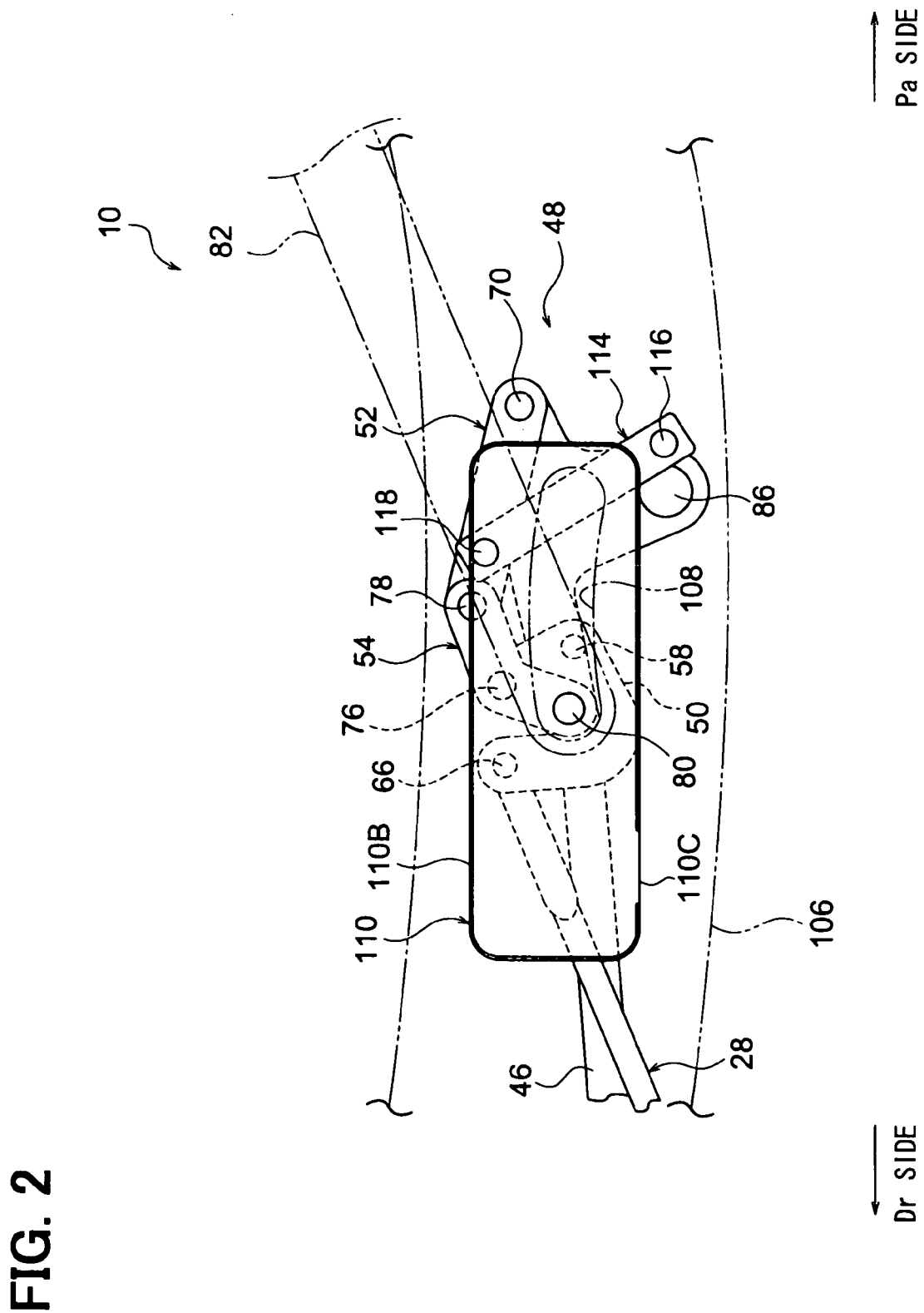
FIG. 2 is a partial plan view of the wiper system in one operational state according to the embodiment, showing the four-bar linkage and the covering member.

Specifically, the covering member 110, which has a rectangular shape in a plan view thereof, is placed such that a longitudinal direction of the covering member 110 is directed in the width direction of the vehicle. As shown in FIG. 2, a size of the covering member 110 is set to be larger than a size of the opening 108 to entirely cover the opening 108 even upon movement of the wiper support shaft 80 in the width direction of the vehicle. Specifically, since the covering member 110 is moved together with the wiper support shaft 80 upon the movement of the wiper support shaft 80, the covering member 110 generally equally extends on both sides of the wiper support shaft 80 in the moving direction of the wiper support shaft 80 to cover the opening 108. That is, preferably, the length of the covering member 110 (measured in the left-right direction in FIG. 2) is generally two times (or more) greater than the length of the opening 108. A circular support hole 110A is formed at generally a center portion of the covering member 110 to extend through the covering member 110 in the vertical direction. Also, a peripheral wall 110B extends along an outer peripheral edge (outer perimeter) of the covering member 110 and projects toward the rear surface of the cowl louver 106 (see FIG. 9), and a notch 110C is notched (recessed) in the peripheral wall 110B.

A location of the notch 110C is determined in view of a location of lubricant, which is applied to the four-bar linkage 48, such that even when water (e.g., rain water), which is accumulated on a top surface of the covering member 110, falls down through the notch 110C, the water is not applied to the lubricant.

Figure 4:
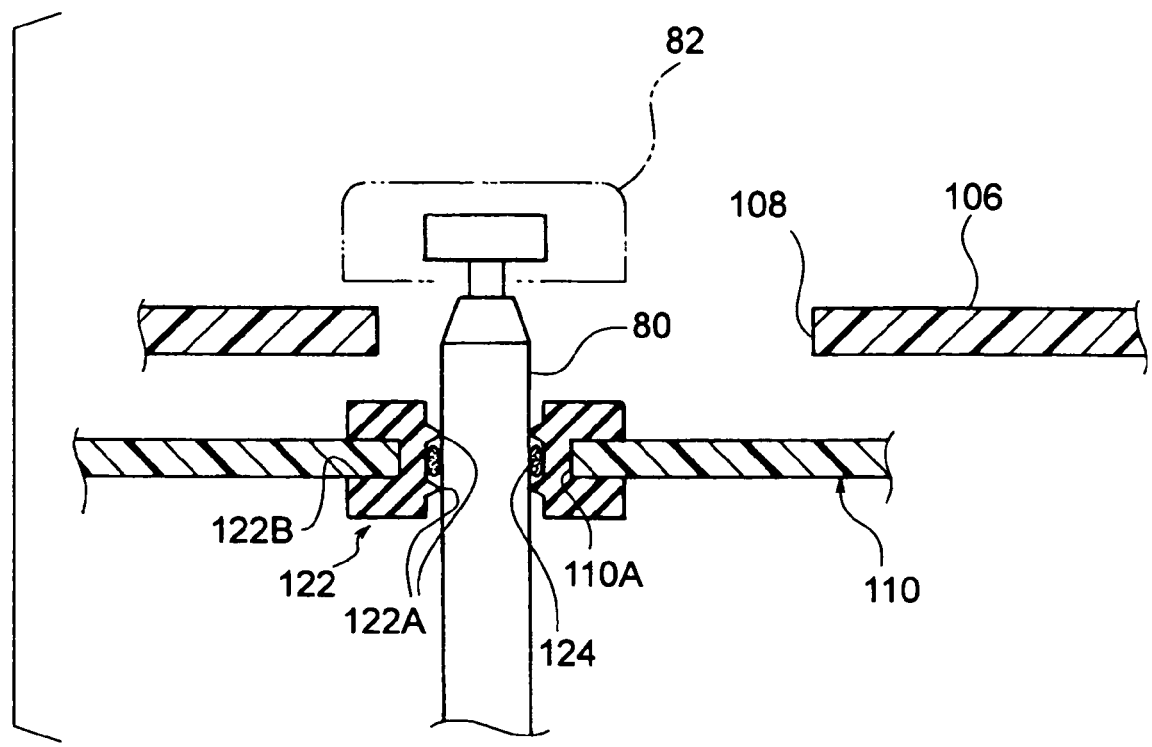
FIG. 4 is a cross sectional view showing a wiper support shaft of the wiper system according to the embodiment.

Also, as shown in FIGS. 1 and 4, a tubular seal member 122, which is made of an elastic material (e.g., elastic rubber or synthetic resin), is provided. A receiving hole 122C extends through the seal member 122 to receive the wiper support shaft 80, and an annular groove 122B is formed in an outer peripheral surface of the seal member 122. When the annular groove 122B of the seal member 122 is fitted into the support hole 110A of the covering member 110, the seal member 122 is installed to the support hole 110A.

Also, two annular protrusions 122A are formed to extend in a circumferential direction in an inner peripheral surface of the receiving hole 122C such that the annular protrusions 122A are placed one after another in the axial direction of the seal member 122. Furthermore, waterproof grease 124 is applied to a space between the annular protrusions 122A in the seal member 122. Watertightness and slidability between the wiper support shaft 80 and the seal member 122 are maintained by the grease 124, which is applied to the space between the annular protrusions 122A.

The grease 124, which is applied to the space between the annular protrusions 122A, is surrounded by the annular protrusions 122A to limit effluent of the grease 124. Therefore, the water tightness and the slidability between the wiper support shaft 80 and the seal member 122 can be maintained for a longer period of time in comparison to a case where the annular protrusions 122A are not provided.

Furthermore, a follower lever 114 is provided in the wiper system 10. One end of the follower lever 114 is pivotably supported by a support portion 112 (serving as a third support member) of the second frame member 44, and the other end of the follower lever 114 is pivotably connected to a connection hole 110D, which is formed through the covering member 110 at a location that is different from the location where the wiper support shaft 80 is supported.

Specifically, the one end of the follower lever 114 is pivotably supported by the support portion 112 through a connection pin 116, and the other end of the follower lever 114 is pivotably connected to the connection hole 110D of the covering member 110 through a connection pin 118 and a fixing member 120. The fixing member 120 is fixed to a distal end portion of the connection pin 118.

Figure 3:
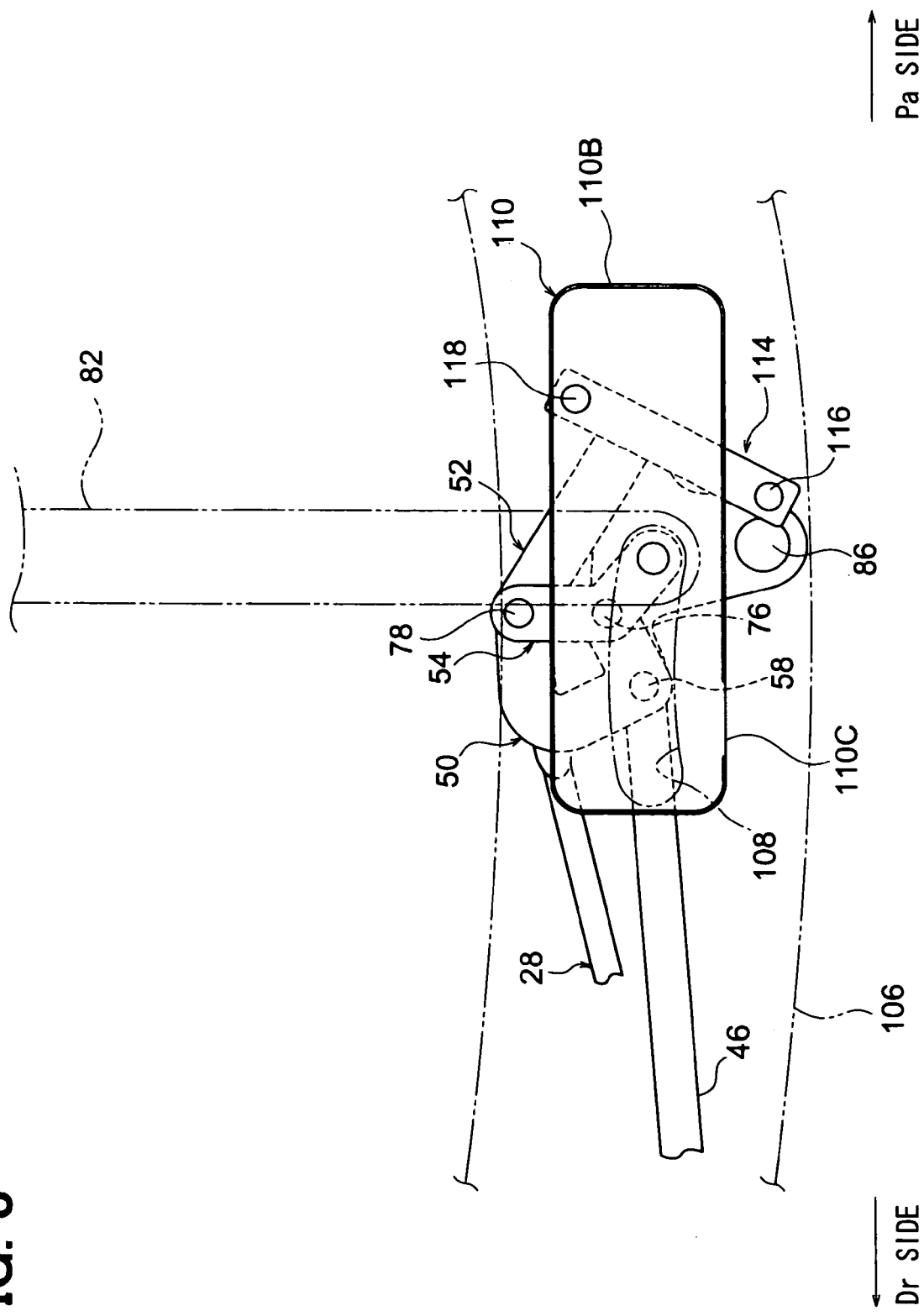
FIG. 3 is a partial plan view of the wiper system in another operational state according to the embodiment, showing the four-bar linkage and the covering member.

With the above construction, when the wiper arm 82 is moved from the stop position shown in FIG. 2 to the upper return position (the upper end position) shown in FIG. 3, the moving attitude (moving posture) of the covering member 110 is limited by a pivot path of the other end portion (the connecting portion to the connection hole 110D of the covering member 110) of the follower lever 114.

When the covering member 110 is provided, the direct viewing of the portion (e.g., the drive mechanism) of the wiper system 10 through the opening 108 of the cowl louver 106 can be limited. Also, the deterioration of the outer appearance of the wiper system 10 can be limited.

Furthermore, when the covering member 110 is provided, intrusion of the foreign material (e.g., foreign debris, foreign dirt) through the opening 108 of the cowl louver 106 into the interior can be limited.

Furthermore, the moving path of the covering member 110 is limited by the follower lever 114. Therefore, the size of the covering member 110 can be made smaller in comparison to the case where the moving attitude (moving posture) of the covering member 110 is not limited.

Also, as discussed above, the two annular protrusions 122A are provided in the receiving hole 122C of the seal member 122, and the grease 124 is applied to the space between the two annular protrusions 122A. In this way, the watertightness and the slidability between the seal member 122 and the wiper support shaft 80 can be maintained. Thereby, it is possible to limit application of the water to the four-bar linkage 48 through the receiving hole 122C and thereby to limit effluent (washout) of the lubricant by the water.

Also, the peripheral wall 110B and the notch 110C are provided to the covering member 110. Thereby, even when the water enters through the opening 108 of the cowl louver 106 and is accumulated on the top surface of the covering member 110, the accumulated water falls down through the notch 110C, which is notched in the peripheral wall 110B. Also, the location of the notch 110C is determined in view of the location of lubricant, which is applied to the four-bar linkage 48. Therefore, even when water (e.g., rain water), which is accumulated on the top surface of the covering member 110, falls down through the notch 110C, the water is not applied to the lubricant. As a result, the effluent of the lubricant or the like applied to the four-bar linkage 48 caused by the water entered through the opening 108 can be limited.

Furthermore, although not mentioned above, the covering member 110 may be made of a resin material, which is colored to an appropriate color (e.g., black color) in conformity with the vehicle design and/or the color of the cowl louver 106. In such a case, it is possible to limit the deterioration of the outer appearance.

Furthermore, the covering member 110 may be made of a semitransparent or opaque resin material to limit the direct viewing of the interior through the elongated opening 108.

Additional advantages and modifications will readily occur to those skilled in the art. The invention in its broader terms is therefore not limited to the specific details, representative apparatus, and illustrative examples shown and described.

What is claimed is:

1. A wiper system for a vehicle, comprising:
    a wiper support shaft that supports a wiper, which is adapted to wipe a windshield glass of the vehicle, wherein the wiper support shaft projects outward through an opening of a cowl louver that is placed on a vehicle front side of the windshield glass;
    a drive mechanism that is adapted to drive the wiper support shaft to move the wiper support shaft in the opening of the cowl louver in such a manner that a wiping range of the wiper, which is installed to the wiper support shaft, changes on the windshield glass; and
    a covering member that is entirely placed under the cowl louver and is supported by the wiper support shaft, wherein the covering member is moved in response to movement of the wiper support shaft and covers the opening of the cowl louver to limit direct viewing of the drive mechanism through the opening of the cowl louver.

2. The wiper system according to claim 1, wherein the drive mechanism includes:
    a main lever that is pivotably supported by a first support member and is reciprocally pivoted by a drive force of a drive source;
    a sub-lever that is pivotably supported by a second support member, which is spaced from the first support member; and
    a connecting lever that supports the wiper support shaft and is pivotably connected to a first connecting member, which is provided at a location spaced from the first support member of the main lever, wherein the connecting lever is pivotably connected to a second connecting member, which is provided at a location spaced from the second support member of the sub-lever and also spaced from the first connecting member.

3. The wiper system according to claim 1, further comprising an attitude limiting means for limiting a moving attitude of the covering member when the covering member is moved in response to movement of the wiper support shaft.

4. The wiper system according to claim 3, wherein:
    the attitude limiting means includes a follower lever, which is pivotably supported by a third support member at one end of the follower lever and is pivotably connected to the covering member at the other end of the follower lever at a location that is different from a location where the wiper support shaft is supported in the covering member; and
    the follower lever is pivoted by the movement of the wiper support shaft.

5. The wiper system according to claim 1, further comprising a tubular seal member that is installed to a support hole formed in the covering member and has a receiving hole, through which the wiper support shaft is received, wherein the receiving hole of the seal member includes a fluid-tightly sliding means for fluid-tightly pivoting and sliding the wiper support shaft.

6. The wiper system according to claim 5, wherein the fluid-tightly sliding means includes:
    first and second annular protrusions that are formed in an inner peripheral surface of the receiving hole of the tubular seal member to extend in a circumferential direction of the tubular seal member and are spaced from each other in an axial direction of the tubular seal member; and
    grease that is placed between the first and second annular protrusions.

7. The wiper system according to claim 1, wherein the covering member includes:
    a peripheral wall that extends along an outer perimeter of the covering member and projects toward a rear surface of the cowl louver; and
    a notch that is notched in the peripheral wall.

8. The wiper system according to claim 1, wherein:
    the opening of the cowl louver is elongated generally in a width direction of the vehicle; and
    the drive mechanism drives the wiper support shaft to move the wiper support shaft in the opening of the cowl louver generally in the width direction of the vehicle.

9. The wiper system according to claim 1, wherein a size of the covering member is set to be larger than a size of the opening to entirely cover the opening.

10. The wiper system according to claim 1, wherein the covering member is entirely spaced away from the cowl louver.

11. The wiper system according to claim 1, wherein the drive mechanism includes a four-bar linkage.

12. A wiper system for a vehicle, comprising:
    a wiper support shaft that supports a wiper, which is adapted to wipe a windshield glass of the vehicle, wherein the wiper support shaft projects outward through an opening of a cowl louver that is placed on a vehicle front side of the windshield glass;
    a drive mechanism that is adapted to drive the wiper support shaft to move the wiper support shaft in the opening of the cowl louver in such a manner that a wiping range of the wiper, which is installed to the wiper support shaft, changes on the windshield glass, the drive mechanism including:
- a main lever that is pivotably supported by a first support member and is reciprocally pivoted by a drive force of a drive source;
- a sub-lever that is pivotably supported by a second support member, which is spaced from the first support member; and
- a connecting lever that supports the wiper support shaft and is pivotably connected to a first connecting member, which is provided at a location spaced from the first support member of the main lever, wherein the connecting lever is pivotably connected to a second connecting member, which is provided at a location spaced from the second support member of the sub-lever and also spaced from the first connecting member; and
- a covering member that is placed inside the cowl louver and is supported by the wiper support shaft, wherein the covering member is moved in response to movement of the wiper support shaft and covers the opening of the cowl louver to limit direct viewing of the drive mechanism through the opening of the cowl louver.

13. The wiper system according to claim 12, further comprising an attitude limiting means for limiting a moving attitude of the covering member when the covering member is moved in response to movement of the wiper support shaft.

14. The wiper system according to claim 13, wherein:
- the attitude limiting means includes a follower lever, which is pivotably supported by a third support member at one end of the follower lever and is pivotably connected to the covering member at the other end of the follower lever at a location that is different from a location where the wiper support shaft is supported in the covering member; and
- the follower lever is pivoted by the movement of the wiper support shaft.

15. The wiper system according to claim 12, wherein:
- the opening of the cowl louver is elongated generally in a width direction of the vehicle; and
- the drive mechanism drives the wiper support shaft to move the wiper support shaft in the opening of the cowl louver generally in the width direction of the vehicle.

16. The wiper system according to claim 12, wherein a size of the covering member is set to be larger than a size of the opening to entirely cover the opening.

17. A wiper system for a vehicle, comprising:
- a wiper support shaft that supports a wiper, which is adapted to wipe a windshield glass of the vehicle, wherein the wiper support shaft projects outward through an opening of a cowl louver that is placed on a vehicle front side of the windshield glass;
- a drive mechanism that is adapted to drive the wiper support shaft to move the wiper support shaft in the opening of the cowl louver in such a manner that a wiping range of the wiper, which is installed to the wiper support shaft, changes on the windshield glass; and
- a covering member that is placed inside the cowl louver and is supported by the wiper support shaft, wherein the covering member is moved in response to movement of the wiper support shaft and covers the opening of the cowl louver to limit direct viewing of the drive mechanism through the opening of the cowl louver, the covering member including:
  - a peripheral wall that extends along an outer perimeter of the covering member and projects toward a rear surface of the cowl louver; and
  - a notch that is notched in the peripheral wall.

18. The wiper system according to claim 17, further comprising an attitude limiting means for limiting a moving attitude of the covering member when the covering member is moved in response to movement of the wiper support shaft.

19. The wiper system according to claim 17, wherein:
- the opening of the cowl louver is elongated generally in a width direction of the vehicle; and
- the drive mechanism drives the wiper support shaft to move the wiper support shaft in the opening of the cowl louver generally in the width direction of the vehicle.

20. The wiper system according to claim 17, wherein a size of the covering member is set to be larger than a size of the opening to entirely cover the opening.

* * * * *